April 14, 1942.  H. L. MERRICK  2,279,475
MATERIAL FEEDING MEANS.
Filed June 13, 1940  4 Sheets-Sheet 1
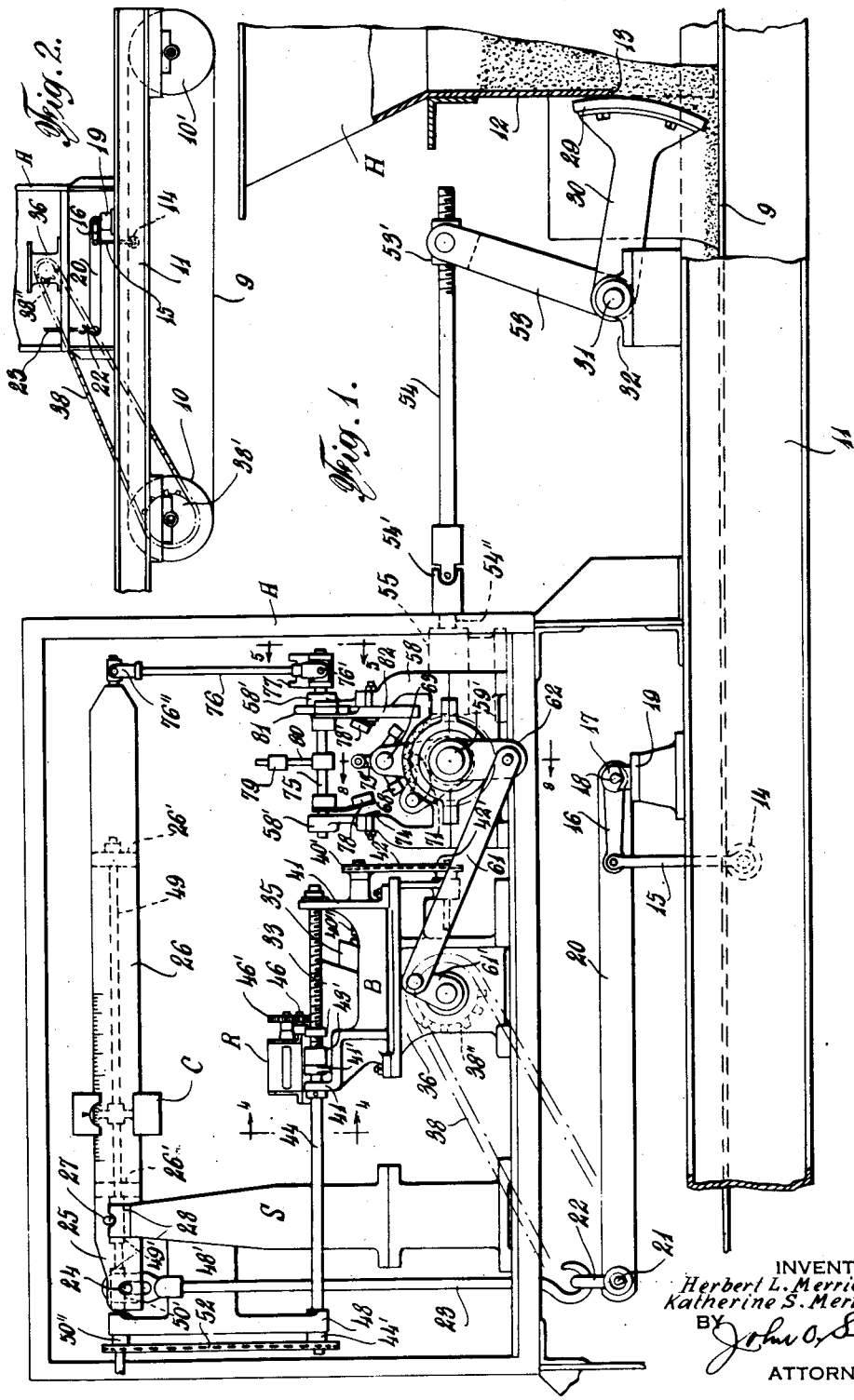
INVENTOR
*Herbert L. Merrick, Dec. By*
*Katherine S. Merrick, Excx.*
BY
ATTORNEY

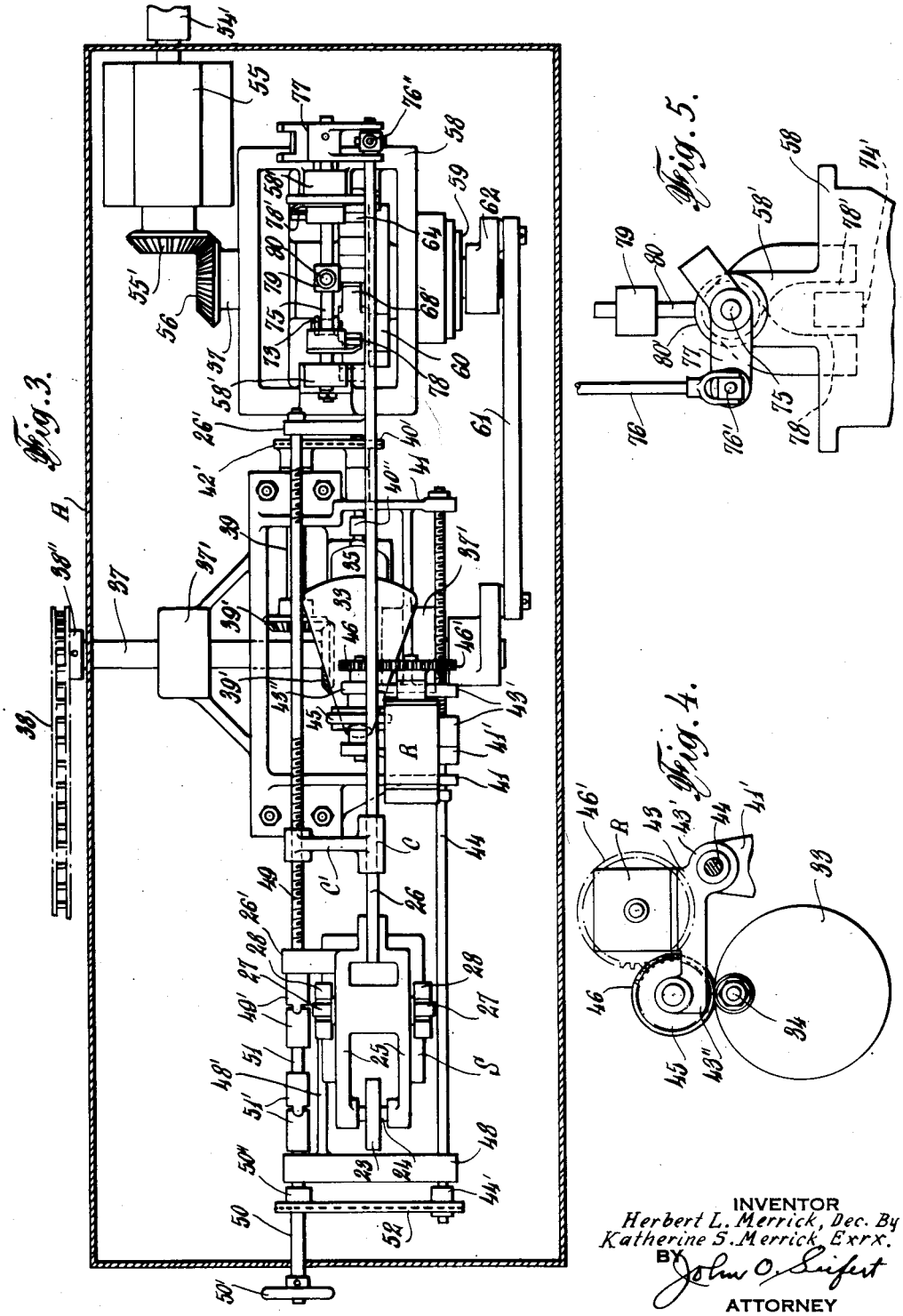

April 14, 1942. H. L. MERRICK 2,279,475
MATERIAL FEEDING MEANS
Filed June 13, 1940 4 Sheets-Sheet 3

INVENTOR
Herbert L. Merrick, Dec. By
Katherine S. Merrick, Exrx.
BY John O. Seifert
ATTORNEY April 14, 1942.  H. L. MERRICK  2,279,475
MATERIAL FEEDING MEANS
Filed June 13, 1940　　4 Sheets-Sheet 4
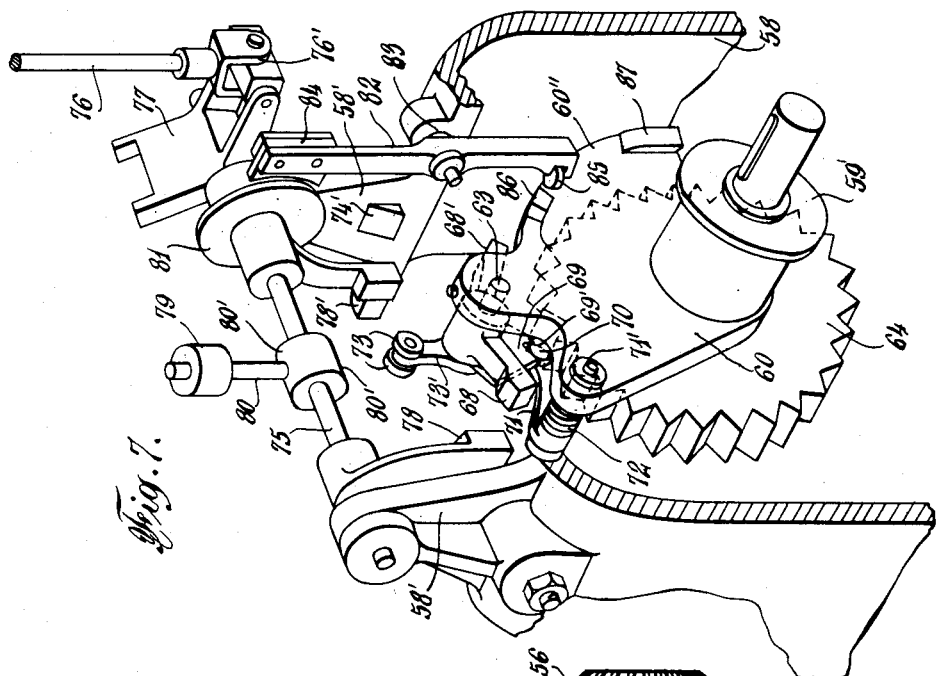
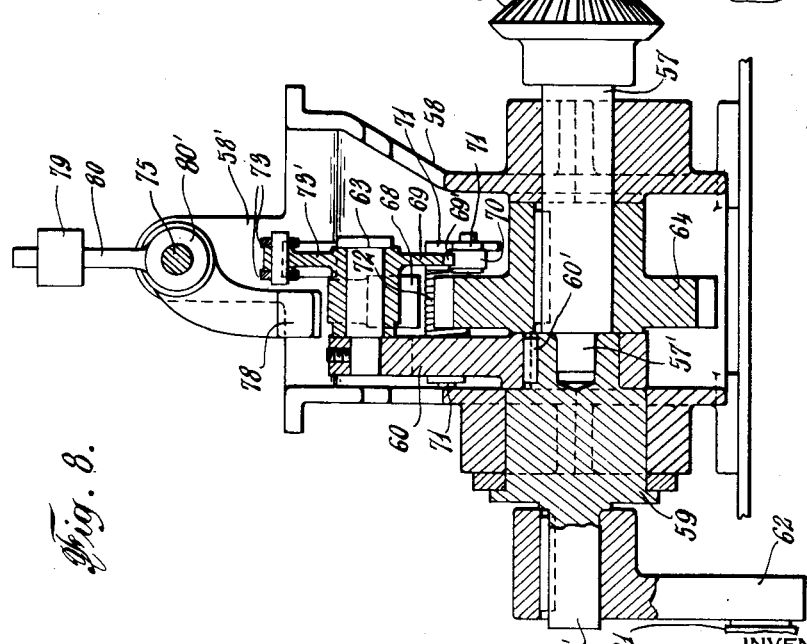
INVENTOR
Herbert L. Merrick, Dec. By
Katherine S. Merrick, Exrx.
BY John O. Seifert
ATTORNEY Patented Apr. 14, 1942

2,279,475

UNITED STATES PATENT OFFICE 2,279,475

MATERIAL FEEDING MEANS

Herbert L. Merrick, deceased, late of Passaic, N. J., by Katherine S. Merrick, executrix, Passaic, N. J., assignor to Merrick Scale Mfg. Company, Passaic, N. J., a corporation of New Jersey Application June 13, 1940, Serial No. 340,264

15 Claims. (Cl. 221—118)

This invention relates to feeding material to and the discharge of material at a constant rate per unit of time by a conveyer wherein the material is delivered from a hopper or bin onto the conveyer and the delivery of the material from the hopper controlled by a gate for the outlet of the hopper arranged with means operative to adjust the gate to control the outlet of the hopper and vary the volume of the material delivered therefrom, and the provision of weighing means including a scale beam arranged with means to support a portion of the conveyer and counterpoise weight adjustable on the weighing beam to counterbalance material of predetermined weight on the conveyer, and the weighing means as it is moved out of equilibrium to underload or overload position by a decrease or increase in the weight of the material transported by the conveyer adapted to render means active to adjust the gate to increase or decrease the area of the hopper outlet and the amount of material delivered from the hopper onto the conveyer.

It is an object of the invention to provide improved means to adjust the gate for the hopper outlet to deliver material of predetermined constant weight to the conveyer, and means controlled by the weighing beam of the weighing mechanism as it is moved out of equilibrium to underload or overload position to render the gate adjusting means active to adjust the gate to increase or decrease the amount of material delivered from the hopper without imposing a load upon the weighing mechanism which will interfere with the proper functioning of the weighing means and delivery of material by the conveyer.

It is another object of the invention to provide in material feeding means of this character means to integrate the weight or amount of material delivered to and discharged by the conveyer and to totalize and record the cumulative weight of such material.

It is a further object of the invention to provide adjustable counterpoise means for the weighing means to change or vary the rate of delivery of material to be fed and discharged by the conveyer and simultaneously adjust the register actuating means to effect actuation of the register to record the cumulative weight of the material fed and discharged by the conveyer in accordance with any change or variation in the weight or volume of material fed by the conveyer.

Other objects and advantages of the invention will hereinafter appear.

In the drawings accompanying and forming a part of this application, Figure 1 is a front elevation of weighing means for weighing material transported by a travelling conveyer showing an embodiment of the actuating means for the adjusting means for the gate to control the delivery of material from a hopper to the conveyer and the means to record the cumulative weight of the material transported by the conveyer, only so much of the conveyer structure and hopper being shown as is essential to an understanding of the invention.

Figure 2 is a front elevation of a conveyer and showing the driving connection between the conveyer and the actuating means for the register and the actuating means for the gate adjusting means.

Figure 3 is a plan view of the weighing means and showing the register and the actuating means for the register and gate adjusting means in relation thereto, an enclosing housing for the same being shown in section.

Figure 4 is a section taken on the line 4—4 of Figure 1.

Figure 5 is a section taken on the line 5—5 of Figure 1.

Figure 7 is a perspective view of the actuating means for the gate adjusting means and showing the means controlled by the weighing means to couple the same to the gate adjusting means.

Figure 8 is a sectional view of the means controlled by the weighing means to couple the gate adjusting means to its actuating means, the section being taken on the line 8—8 of Figure 1.

Figure 6:
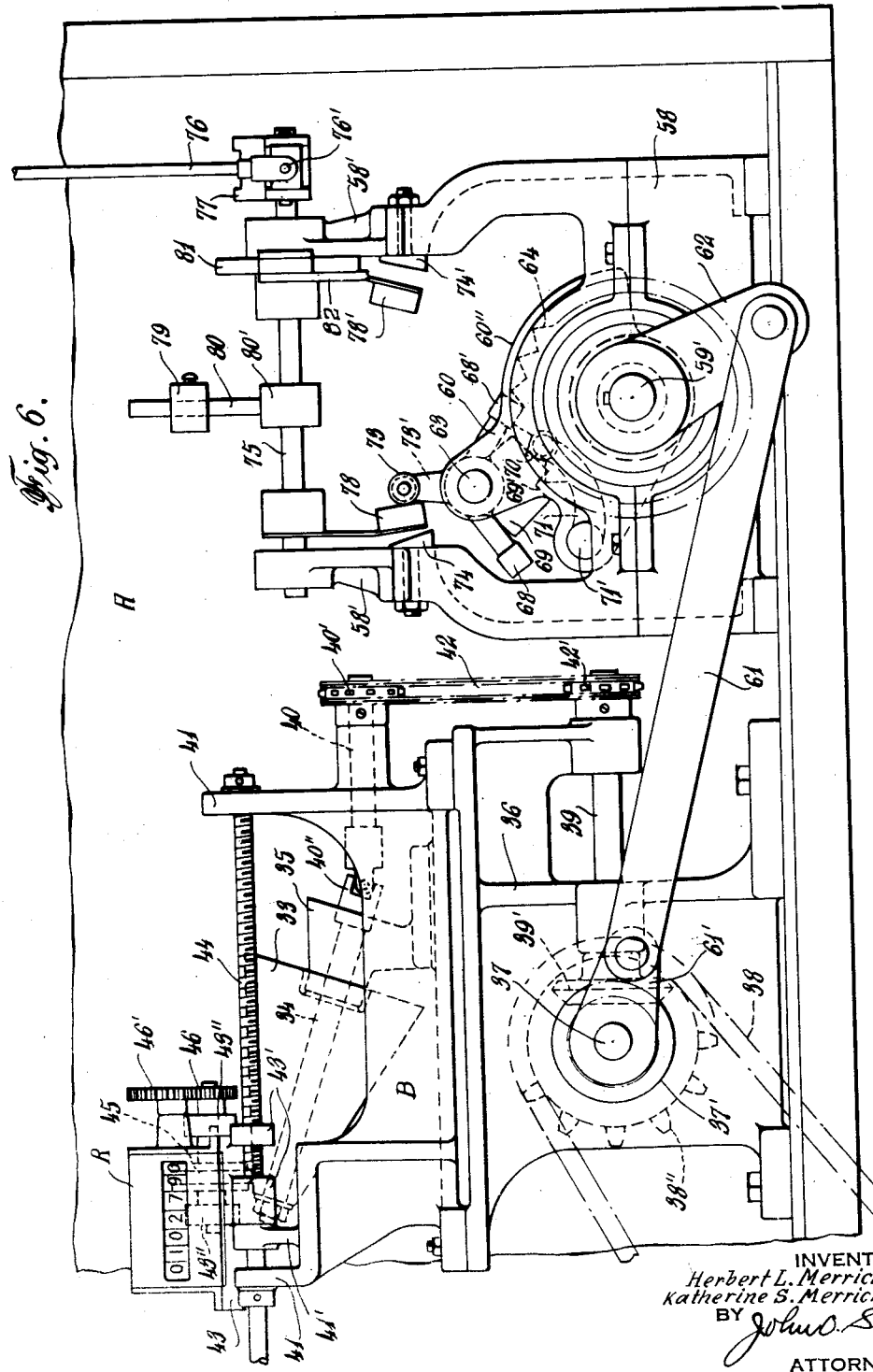
Figure 6 is a front elevation, on an enlarged scale, of the actuating means for the register and gate adjusting means and showing the driving means therefor.

In carrying out the embodiment of the invention shown in the drawings there is provided a travelling belt conveyer 9 passing around drums 10, 10' rotatably supported at the opposite ends by parallel beams 11 of a supporting structure and one of said drums, such as the drum 10, rotated from a suitable source of power, such as electric motor, not shown. The conveyer travels in a direction indicated by the arrow with the upper stretch disposed between the beams 11. The material is delivered onto the conveyer adjacent the conveyer supporting drum 10' from a hopper or bin H having a portion the side and rear walls of which terminate slightly above the upper stretch of the conveyer and the front wall 12 being of less length than said side and rear walls arranging the hopper with an outlet 13, as shown in Figure 1, through which the material is delivered from the hopper by the travel of the conveyer.

To weigh material as it is transported by the conveyer a portion of the upper stretch of the conveyer intermediate the conveyer supporting drums is supported by a roller 14 rotatably carried at the ends by links 15 suspended from lever arms 16 fixed to and extending laterally from a shaft 17 having knife edge pivot bearings 18 at the opposite ends engaging bearing members 19 mounted on the frame beams 11. A lever 20 fixed at one end to the shaft 17 and of greater length than the lever arms 16 has knife edge pivot bearings at the opposite end, as at 21, engaging circular bearing members at the ends of a yoke member 22 to which is connected a link 23 suspended from a knife edge pivot bearing 24 fixed at the ends in and extending between the legs 25 of a bifurcated portion at the end of a weighing beam 26. The weighing beam is pivotally supported by knife edge pivot bearings 27 fixed in and extending laterally from the weighing beam engaging bearings in legs 28 of a bifurcation at the upper end of a standard S mounted upon the supporting structure of the housing A. The weighing beam is provided with means to counterbalance a load or different loads of predetermined weight upon the conveyer and vary the rate of feed of material by the conveyer, and is shown as an adjustable counterweight C slidably mounted on the long end of the weighing beam.

To feed material at a constant rate and to vary the feeding of material by the conveyer means are provided to control and vary the delivery of material from the hopper. As shown, this means comprises an adjustable gate to vary the area of the hopper outlet, the gate being in the form of a plate 29 fixed to the end of a pair of arms 30 fixed on a shaft 31 journaled in bearings 32 fixed on the beams 11 of the supporting structure, whereby the gate is supported to have pivotal movement in an arcuate path relative to the hopper outlet, the outer face of the plate being of convex form transversely of the plate. The gate may be set to feed material onto the conveyer to be fed or transported by the conveyer at a constant rate predetermined by the setting of the counterpoise weight on the weighing beam.

To record the total or cumulative weight of the material transported or fed by the conveyer a register is provided and shown in a conventional manner at R. The register is actuated from a friction cone 33 fixed on a shaft 34 journaled in an arm 35 of a bracket B to rotate on an axis inclining to the horizontal with the upper portion of the surface of the cone extending in a horizontal plane, the bracket being fixed upon a base member 36 fixed upon the supporting frame for the housing A. The friction cone is operatively connected to and driven from the conveyer at a speed proportional to the speed of travel of the conveyer. For this purpose a shaft 37 journaled in the bearings 37' on the base member 36 is driven from the conveyer driving drum 10 by a sprocket chain 38 passing around a sprocket wheel 38' rotatable with said drum and a sprocket wheel 38'' fixed on the shaft 37. A shaft 39 operatively connected to and driven from the shaft 37 by beveled gears 39' is operatively connected to and drives a shaft 40 journaled in the bracket B also fixed upon the base member 36 by a sprocket chain 42 passing around the sprocket wheel 42' fixed on the shaft 39 and a sprocket wheel 40' on the shaft 40, the shaft 40 having a universal joint connection 40'' with the cone carrying shaft 34. To actuate the register from the rotation of the friction cone the register is mounted on a bracket 43 by perforated ears 43' extending downwardly and laterally to one side of the longitudinal center of the bracket (Figure 4) loosely engaged upon a rod 44 mounted at one side of the center of the friction cone in arms 41 projecting from the bracket B. A friction wheel 45 is fixed on a shaft rotatably mounted in arms 43'' extending from the register supporting bracket opposite to the ears 43'. The friction wheel contacts with and is rotated from the friction cone 33 and the register is actuated from the rotation of the friction wheel by a pinion 46 fixed on the friction wheel carrying shaft meshing with a gear 46' connected to and rotatable with the primary digit wheel of the register. By the arrangement of mounting the register carrying bracket at one side of the longitudinal center thereof and at a side of the friction cone the friction wheel is caused to frictionally engage the friction surface of the cone by the weight of the bracket and the register and friction wheel carried thereby.

To actuate the register to record loads of different weight transported by the conveyer the supporting shaft 44 for the register carrying bracket is rotatable and is held against longitudinal movement by collars secured by pins or set screws on the shaft at the outer side of the bracket arms 41, and the shaft is screw threaded and the openings in the bracket ears 43' are provided with complemental screw threads for the engagement of the threads on said shaft. As shown in Figure 6, the register and friction wheel carrying bracket is adjusted to its extreme left hand position in abutting relation to a fixed stop 41' in the form of an arm fixed to or integral with and extending upwardly from the bracket B, the shaft 44 loosely engaging an opening in said abutment. The friction wheel and register carrying bracket is adapted to be moved longitudinally of the friction cone to engage the friction wheel at different positions longitudinally of the friction face of the cone and thus adapt the register to be actuated to record loads of different weight transported or fed by the conveyer. To effect adjustment of said bracket simultaneously with the adjustment of the counterpoise weight on the weighing beam the shaft 44 is of a length to be rotatably engaged in a bracket 48 having a laterally extending arm 48' whereby it is fixed to the weighing beam supporting standard S. The counterweight C has a laterally extending arm C' arranged with a boss at the end having a screw threaded opening therein for the engagement of a shaft 49 having a thread thereon of the same pitch as the thread on the shaft 44, said shaft 49 being journaled in arms 26' extending laterally and parallelly from the rear of the weighing beam. The shaft 49 is coupled to a shaft 50 journaled in the bracket 48 through an intermediate shaft 51 having a universal joint connection 51' with the shaft 50 and a universal joint connection 49' with the shaft 49. The shaft 49 participates in any deflection of the weighing beam and by this universal joint connection of the shafts it will not interfere with the movement of the weighing beam. The shaft 50 and thereby the shaft 49 is rotated by a hand wheel 50' fixed on the shaft 50 and the rotation of the shaft 50 transmitted to the shaft 44 to effect adjustment of the friction wheel relative to the friction cone proportional to the adjustment of the counterpoise weight on the weighing beam by a sprocket chain 52 passing around a sprocket wheel 50'' on the shaft 50 and a sprocket wheel 44' on the shaft 44.

Due to changes and variations in the amount of material delivered from the hopper onto the conveyer it may be possible that the volume of material delivered from the hopper will be of less or greater weight than the weight for which the weighing means is set with the result that the material transported and fed by the conveyer will not be of a desired constant volume or weight. For this purpose means are provided to effect automatic adjustment of the gate to regulate the hopper outlet and delivery of material from the hopper controlled by the movement of the weighing means out of equilibrium to underload or overload position. As shown, this means comprises a lever arm 53 fixed on the gate carrying shaft 31 and forming with the gate carrying arms an angle lever. A block 53' having a screw threaded bore is pivotally mounted in and between the arms of a bifurcation at the end of said lever to pivotally move on an axis extending parallelly of the shaft 31. A shaft 54, as shown in Figure 1, has screw threaded connection with said block and a universal joint connection 54' with a shaft 54'' extended through the wall of the housing A and journaled in a bearing 55 mounted on the supporting structure for said housing. A beveled gear 55' on said shaft 54'' meshes with the beveled pinion 56 on a shaft 57 journaled in a bearing in the side wall of a bracket 58 (Figure 8) having a pilot bearing 57' in a member 59 rotatably mounted in the opposite side wall of the bracket 58. The bracket 58 is arranged in alinement with the base member 36. An arm in the form of a segmental plate 60 is mounted upon a reduced portion of the member 59 concentrically of the pilot bearing of the shaft 57 therein and keyed thereto, as at 60', to participate in the rotation of said member 59. Predetermined oscillatory movement is imparted to the member 59 and arm 60 from the shaft 37 actuating the friction cone 33 by a rod 61 pivotally connected at one end to a crank arm 62 mounted on and keyed to a reduced axial projecting portion 59' of the member 59 and extends opposite to the arm 60. The rod 61 is pivotally connected at the opposite end to a crank arm 61' fixed on the shaft 37. The member 59 and arm 60 are continuously oscillated from the rotation of the shaft 37 and are disconnected from the shaft 57 and the latter remaining idle when the weighing mechanism is in equilibrium and material is being fed at a constant rate, that is, in predetermined amount or weight by the conveyer. When there is a variation in the amount or weight of the material fed by the conveyer the oscillatory movement of the arm 60 is caused by means controlled by the movement of the weighing means to underload or overload position to be transmitted to rotary movement of the shafts 54, 54'' and thereby adjust the gate 29 to decrease or increase the amount of material delivered from the hopper onto the conveyer. This means (Figures 6, 7 and 8) comprises a pawl pivotally mounted on a stud 63 fixed in and extending laterally from the arm 60 to be disposed above and relative to the periphery of a toothed wheel or gear 64 mounted on and keyed to the shaft 57 in juxtaposed relation to the arm 60, as shown in Figure 8. The pawl is provided with a pair of pallets 68, 68' diverging from the pivot support 63 of the pawl toward the periphery of the toothed wheel. The pawl is arranged with a downwardly extending plate portion 69 of rectangular form with side edges thereof converging downwardly and arranged with a notch 69' in the angle formed by said edges adapted to be engaged by a roller 70 carried by a detent arm 71 mounted on a headed stud 71' fixed in the arm 60 similarly to the pawl carrying stud, and the arm urged in a direction toward the plate projection 69 by a spring 72 coiled about the stud with one end of the spring engaging the detent arm and the opposite end attached to the arm 60. The detent roller 70 when the weighing means is in equilibrium engages the plate notch 69' with both pawl pallets maintained out of engagement with the toothed wheel during the oscillation thereof with the pawl carrying arm 60, as shown in Figure 7. The pawl is moved to said position by rollers 73 carried by an arm 73' projecting laterally from the pawl midway the pawl pallets engaging by the oscillatory movement of the pawl carrying arm with one of a pair of fixed abutments of wear resisting material 74, 74' carried by studs whereby they are mounted on arms 58' extending upwardly from the bracket 58 with the abutments disposed at opposite sides and in the path of movement of the pawl projection 73', the rollers carried by the pawl projection being adapted to engage with one of said abutments and move the pawl to the position shown in Figure 7 with the detent roller engaging the notch in the plate 69 projecting from the pawl when the weighing means is in equilibrium.

The oscillatory movement of the pawl carrying arm 60 is transmitted to rotary movement of the toothed wheel 64 and thereby rotates the shafts 54, 54'' to vary the area of the hopper outlet to increase or decrease the amount of material delivered from the hopper by adjusting the pawl to move the detent roller engaging in the notch in the pawl plate 69 to engage an edge of said plate at the side of the notch and thereby positioning the pawl pallet 68', for instance, as shown in Figure 6, whereby as the pawl is moved by the pawl carrying arm in one direction the pawl will engage a tooth of and rotate the toothed wheel 64 in one direction, the pawl pallet riding over the teeth of said wheel in the retrograde movement thereof.

The adjustment of the pawl is effected by the movement of the weighing beam 26 out of equilibrium to underload or overload position. For this purpose the weighing beam 26 is connected to a rock shaft 75 rotatably mounted in the bracket arms 58' by a rod 76 having a universal joint connection 76' with a bifurcated arm of a lever 77 fixed on the rock shaft 75, the opposite end of the rod being pivotally connected, as at 76'' to the end of the weighing beam. A pair of abutments 78, 78' arranged on arms fixed on the rock shaft 75 are disposed at opposite sides of the pawl and the arms arranged on the shaft so that the abutment 78 will be at one side and the abutment 78' at the opposite side of the path of movement of the pawl projection 73' when the weighing beam is in position of equilibrium, as shown in Figure 7.

Should the long end of the weighing beam be moved downward to underload position due to a quantity of material being fed by the conveyer being in volume or weight less than the material which will counterbalance the weight on the weighing beam, the rock shaft through its connection with the weighing beam will be rocked to position the abutment 78 in the path of movement of the pawl projection 73', and as the pawl with its carrying arm is moved to the left, as viewed in Figure 6, the rollers 73 will engage the abutment 78 and thereby move the pawl on its pivot support to move the notch 69' in the plate projection 69 out of engagement with the detent roller 70 and cause said roller to engage the edge of the plate projection 69 at the right of the notch and move the pawl pallet 68' to position to engage a tooth space in the toothed wheel 64, thereby coupling the pawl carrying arm to said toothed wheel and the gate adjusting means. As the pawl carrying arm is moved to the right, as viewed in said Figure 6, the gate adjusting shafts 54, 54'' are rotated to adjust the gate to increase the area of the hopper outlet and increase the amount of material delivered from the hopper onto the conveyer. When the material delivered onto the conveyer has been increased sufficiently to bring the weighing beam into balance the rock shaft 75 is actuated to position the abutment 78 out of the path of movement of the pawl projection 73' and as the pawl is moved in a direction away from said abutment 78 the rollers carried by the pawl projection 73' will engage the fixed abutment 74' and the pawl is thereby actuated to position with the detent roller 70 engaging the notch 69' in the plate projection 69, as shown in Figure 7, and the pawl is retained in said position until the weighing beam is again moved to underload or overload position.

Should the weighing beam be moved to overload position by material on the conveyer greater than a predetermined quantity for which the counterweight is set and to counterbalance the weighing beam the rock shaft 75 through its connection with the weighing beam is actuated to position the adjustable abutment 78' into the path of movement of and to be engaged by the rollers 73 carried by the pawl projection 73', said engagement of the rollers with said abutment 78' actuating the pawl to move the notch 69' in the pawl plate 69 out of engagement with the detent roller 70 and cause said roller to engage the edge of the plate 69 at the left of said notch and engage the pawl pallet 68 in a tooth space in the toothed wheel 64. As the pawl projection is moved away from the abutment 78' the movement of the pawl carrying arm 60 by the engagement of said pawl pallet in a tooth space of the toothed wheel will impart rotative movement to said wheel and thereby rotate the gate adjusting shafts 54, 54'' to actuate the gate to decrease the area of the hopper outlet and decrease the amount of material delivered onto the conveyer. When the gate is adjusted to position to deliver material in sufficient quantity onto the conveyer to move the weighing beam into equilibrium the rock shaft 75 is actuated to move the abutment 78' out of the path of movement of the pawl projection 73' and the abutment 78 is also positioned out of the path of movement of said pawl projection, and as the pawl is moved in the direction toward the abutment 78' it will engage the fixed abutment 74' and is thereby actuated to adjust the pawl to position with the detent roller 70 engaging the notch 69' in the plate projection 69.

A weight 79 is adjustably mounted on a pin 80 fixed in a collar 80' fixed on the rock shaft 75 and arranged so that the pin and weight will project perpendicular to the rock shaft when the weighing beam is in equilibrium so that the weight will not exert a force on the weighing beam which would tend to move the weighing beam out of equilibrium, and when the rock shaft is rocked to position one of the adjustable abutments 78, 78' into the path of movement of the pawl projection 73' said weight 79 serves as auxiliary counterpoise weight applied to the weighing beam to be overcome by the movement of the weighing beam to position of equilibrium.

To hold the rock shaft against movement and thus prevent chattering movement of the weighing beam as the rollers 73 carried by the pawl projection 73' are engaged with the abutments 78, 78' or 74, 74', means which is in the nature of brake mechanism is provided and consisting of a disk 81 fixed on the rock shaft. A lever 82 pivotally mounted on the bracket 58, as at 83, has a shoe 84 fixed to one arm of the lever in line with the disk 81 and has one edge opposed to the disk arranged of arcuate form corresponding to the curvature of the periphery of the disk. The other arm of the lever carries a roller 85 disposed in the path of movement of and adapted to be engaged by cam projections 86, 87 extending laterally and spaced from each other relative to the periphery of an arcuate portion 60'' of the pawl carrying arm or plate 60. The lever is urged in a direction to move the roller carrying arm toward the pawl carrying arm and as the pawl carrying arm is oscillated in one direction the cam projection 86 will engage the roller 85 and actuate the lever to engage the arcuate face of the shoe 84 with the disk 81, and as said arm is oscillated in the opposite direction the cam projection 87 will engage the roller 85 and actuate the lever to move the arcuate face of the shoe 84 into engagement with the periphery of said disk.

It will be obvious that various modifications may be made in the construction and arrangement of parts without departing from the scope of the invention, and that portions of the invention may be used without others and come within the scope of the invention.

Having described the invention, what is claimed is:

1. In material feeding means, a conveyer, a weighing beam arranged with means to support a portion of the conveyer and a counterpoise weight adjustable thereon to counterbalance a load of predetermined weight on the conveyer, a material supply hopper having an outlet to deliver material onto the conveyer, an adjustable gate to control the delivery of material from the hopper outlet in amount corresponding to the weight for which the counterpoise weight is set, means to adjust the gate including a rotatable toothed wheel, an oscillatory arm juxtaposed to and pivotally supported coaxially of said toothed wheel, means to oscillate said arm, a pawl pivotally carried by said arm disposed relative to the periphery of the toothed wheel, said pawl having a pair of pallets diverging from its pivot support toward the periphery of the toothed wheel and a projection extending laterally therefrom midway the pawl pallets, a pair of fixed abutments in the path of movement of and adapted to be engaged by said pawl projection in the oscillatory movement thereof to position the pawl with the pallets out of engagement with the toothed wheel during the oscillation of the pawl, a pair of adjustable abutments adapted to be positioned into and out of the path of movement of the pawl projection, means connecting said adjustable abutments to and operative by the movement of the weighing beam to underload position to position one of said abutments in the path of movement of the pawl projection to be engaged thereby and actuate the pawl to position one pallet to engage a tooth of and rotate the toothed wheel in one direction by the oscillation of the pawl and adjust the gate to increase the volume of material delivered from the hopper outlet, and operative by the movement of the weighing beam to overload position to position the other of said abutments in the path of movement of the pawl projection to be engaged thereby and position the other pallet to engage a tooth of and rotate the toothed wheel in the opposite direction by the oscillation of the pawl and adjust the gate to decrease the volume of material delivered from the hopper outlet, and a yielding detent adapted to releasably retain the pawl in any one of its positions.

2. In material feeding means, a travelling conveyer, a weighing beam supporting a portion of the conveyer and having a counterpoise weight adjustable thereon to counterbalance a load of predetermined weight upon the conveyer, a material supply hopper having an outlet to deliver material onto the conveyer, an adjustable gate to control delivery of material from the hopper outlet in an amount corresponding to the weight for which the counterpoise weight is set upon the scale beam, means to adjust said gate to increase the amount of material delivered from the hopper by the movement of the weighing beam to underload position and decrease the amount of material delivered from the hopper by the movement of the weighing beam to overload position, comprising an arm fixed to the gate, a rotatable shaft having screw threaded connection with a block pivotally carried by said arm, a rotatable toothed wheel operatively connected to said shaft to transmit the rotation of said wheel to the shaft, an arm juxtaposed to and oscillatory on an axis axially of the toothed wheel, a pawl pivotally carried by said arm disposed relative to the periphery of the wheel, said pawl having a pair of pallets diverging from the pivot support of the pawl toward the periphery of the toothed wheel and a projection extending laterally from the pawl midway the pallets, means to operatively connect said arm to and impart continuous predetermined oscillatory movement thereto from the actuating means for the conveyer, a pair of fixed abutments disposed at opposite sides of and in the path of movement of the pawl projection adapted to be engaged by the pawl projection and move the pawl to position with the pawl pallets out of engagement with the toothed wheel, a pair of adjustable abutments disposed at opposite sides of the pawl projection, means connecting said adjustable abutments to the weighing beam operative by the movement of the weighing beam to underload position to position one of said adjustable abutments in the path of movement of and adapted to be engaged by the pawl projection to actuate the pawl to engage one of the pawl pallets with the teeth of and rotate said toothed wheel in one direction by the oscillation of the pawl carrying arm and adjust the gate to increase the amount of material delivered from the hopper and position the other of said adjustable abutments into the path of movement of and adapted to be engaged by the pawl projection and actuate the pawl to engage the other pawl pallet with the teeth of and rotate said toothed wheel in the opposite direction by the oscillation of the pawl carrying arm, and a yielding detent adapted to releasably retain the pawl in any one of its adjusted positions.

3. Material feeding means as claimed in claim 2, wherein the pawl is provided with a rectangular plate projecting from the pawl opposite the pawl projection with the edges of the plate converging toward each other and arranged with a notch in the angle formed by said edges of the plate, and the detent is carried by the pawl carrying arm in line with said plate and yieldingly urged toward said plate, and said detent adapted to engage the notch in the plate and releasably retain the pawl in position with the pawl pallets maintained out of engagement with the teeth of the toothed wheel in the position of equilibrium of the weighing beam, and to engage an edge of the plate at one side of the notch and retain the pawl in position to cause one of the pawl pallets to engage the teeth of the toothed wheel by the oscillation of the pawl carrying arm and engage the opposite edge of the plate and retain the pawl in position to cause the other pawl pallet to engage the teeth of the toothed wheel by the oscillatory movement of the pawl carrying arm.

4. In material feeding means, a travelling material transporting conveyer, a hopper having an outlet to deliver material onto the conveyer, weighing mechanism arranged to support a portion of the conveyer and counterbalance a load of predetermined weight transported by the conveyer, a register, means operative from the conveyer operatively connected to and actuating the register to record the weight of the material transported by the conveyer, an adjustable gate to control the area of the hopper outlet and delivery of material from the hopper onto the conveyer, means to adjust said gate, means operative to connect and actuate the gate adjusting means from the means operative from the conveyer to actuate the register and normally disconnecting the gate adjusting means therefrom, and means controlled by the movement of the weighing mechanism to underload or overload positions to connect and actuate the gate adjusting means from said means operative from the conveyer to adjust said gate to vary the area of the hopper outlet to increase or decrease the delivery of material from the hopper onto the conveyer and maintain the delivery of material by the conveyer at a constant predetermined rate.

5. Material feeding means as claimed in claim 2, wherein the adjustable abutments are carried by a rock shaft and the weighing beam is connected to said shaft to rock the shaft to position one of said abutments in the path of movement of the pawl projection by the movement of the weighing beam to underload position and to position the other of said abutments in the path of movement of the pawl projection by the movement of the weighing beam to overload position, and means operative from the pawl carrying arm to hold the rock shaft against movement and prevent disturbing the equilibrium of the weighing beam by the engagement of the pawl projection with said abutments.

6. Material feeding means as claimed in claim 2, wherein the adjustable abutments are carried by a rock shaft and the weighing beam is connected to said shaft to rock the shaft to position one of said abutments in the path of movement of the pawl projection by the movement of the weighing beam to underload position and to position the other of said abutments in the path of movement of the pawl projection by the movement of the weighing beam to overload position, a disk fixed on the rock shaft, a pivoted lever, a shoe carried by one arm of the lever adapted to be engaged with the periphery of said disk, a roller carried by the other lever arm, and said pawl carrying arm arranged with cam projections adapted to engage the roller carried by the one lever arm just prior to engagement of the pawl projection with an adjustable abutment to actuate the lever to engage the shoe with the disk on the rock shaft and hold the rock shaft against movement to prevent disturbing the equilibrium of the weighing beam by the engagement of the pawl projection with said abutments.

7. In material feeding means, a travelling conveyer, a weighing beam arranged with means to support a portion of the conveyer, counterpoise adjustable on the beam to counterbalance a load of predetermined weight upon the conveyer, a material supply hopper having an outlet to deliver material from the hopper onto the conveyer, a gate controlling the hopper outlet to deliver material onto the conveyer in amount equal to the weight of the load to be counterbalanced by adjustment of the counterpoise on the weighing beam, a friction cone rotatable on an axis with the upper surface thereof extending in a horizontal plane and rotated from the conveyer at a speed proportional to the speed of travel of the conveyer, a friction wheel contacting and rotated from said friction cone, a register operatively connected to and actuated from the rotation of said friction wheel to record the weight of the material transported and fed by the conveyer, and manually operative means to simultaneously adjust the counterpoise on the weighing beam and the friction wheel relative to the friction cone proportional to the adjustment of the counterpoise on the weighing beam.

8. In material feeding means, a travelling conveyer, a weighing beam arranged with means to support a portion of the conveyer, a counterpoise weight adjustable on the beam to counterbalance loads of different predetermined weight upon the conveyer, a material supply hopper having an outlet to deliver material from the hopper onto the conveyer, an adjustable gate to control the hopper outlet and delivery of material onto the conveyer in an amount equal to the weight of the load counterbalanced upon the portion of the conveyer supported by the weighing beam predetermined by the setting of the counterpoise weight on the weighing beam, a friction cone rotatable on an axis with the upper surface thereof extending in a horizontal plane rotated from the conveyer at a speed proportional to the speed of travel of the conveyer, a friction wheel contacting and rotated from said friction cone, a register operatively connected to and actuated from the rotation of said friction wheel to record the total weight of material transported and fed by the conveyer, and means to adjust the counterpoise weight on the weighing beam and simultaneously adjust the register with the friction wheel relative to the friction cone and effect actuation of the register in accordance with the change in the weight of the material counterbalancing the weighing lever.

9. In material feeding means, a travelling conveyer, a weighing beam arranged with means to support a portion of the conveyer, a counterpoise weight adjustable on the beam to counterbalance loads of different predetermined constant weight upon and fed by the conveyer, a friction cone rotatable on an axis to position the upper surface thereof to extend in a horizontal plane and rotated from the conveyer at a speed proportional to the speed of travel of the conveyer, a friction wheel, a carrier for said friction wheel contacting the friction wheel with the friction cone to be rotated therefrom, a register mounted on said carrier operatively connected to and actuated from the friction wheel to record the total weight of the material transported and fed by the conveyer, and said carrier with the register and friction wheel being adjustable longitudinally of the friction cone to position the friction wheel in contact with the friction cone at different positions along the same, and means to simultaneously adjust the counterpoise weight on the weighing beam and the carrier with the register and friction wheel longitudinally of the friction cone.

10. In material feeding means, a travelling conveyer, a weighing beam arranged with means to support a portion of the conveyer, counterpoise adjustable on the weighing beam to counterbalance a load of predetermined constant weight transported and fed by the conveyer, a friction cone rotatable on an axis to position the cone with the upper surface extending in a horizontal plane, means rotatable from the conveyer operatively connected to and rotating the friction cone at a speed proportional to the speed of travel of the conveyer, a friction wheel contacting with and rotated from the friction cone, a register operatively connected to and operative from the rotation of the friction wheel to record the total weight of the material transported by the conveyer, manually operative means to simultaneously adjust the counterpoise on the weighing beam and the friction wheel relative to the friction cone, a material supply hopper having an outlet to deliver material onto the conveyer, an adjustable gate to control the hopper outlet and delivery of material from the hopper onto the conveyer, means to adjust said gate including a rotatable gear, pawl means oscillatory relative to said gear operative from the means rotatable from the conveyer and rotating the friction cone, said pawl means being disconnected from said gear in the load counterbalancing position of the weighing beam, means operative by the movement of the weighing beam to underload position to position the pawl means in operative relation to and transmit the oscillatory movement thereof to rotary movement of the gear in one direction and adjust the gate to increase the rate of delivery of material from the hopper onto the conveyer and by the movement of the weighing beam to overload position to position the pawl means in operative relation to the toothed wheel and transmit the oscillatory movement of said pawl means to rotary movement of the gear in the opposite direction and adjust the gate to decrease the rate of delivery of material from the hopper onto the conveyer.

11. In material feeding means, a travelling conveyer, a weighing beam arranged with means to support a portion of the conveyer, counterpoise adjustable on the weighing beam to counterbalance a load of predetermined weight transported and fed by the conveyer, a friction cone rotatable on an axis to position the cone with the upper surface extending in a horizontal plane, a shaft rotatable from the conveyer, means to operatively connect and rotate the friction cone from said shaft at a speed proportional to the travel of the conveyer, a friction wheel contacting with and rotated from the friction cone, a register operatively connected to and operative from the rotation of the friction wheel to record the total weight of the material transported by the conveyer, a material supply hopper having an outlet to deliver material onto the conveyer, an adjustable gate to control the hopper outlet and delivery of material from the hopper onto the conveyer, means to adjust said gate including a rotatable gear, pawl mechanism oscillatory about the periphery of said gear, means to connect and oscillate said pawl mechanism from the shaft rotated from the conveyor, means engaged by the pawl mechanism in the oscillation thereof operative to position said pawl mechanism out of operative relation with the gear with the weighing beam in load counterbalancing position, and means positioned by the movement of the weighing beam to underload position to be engaged by and cause said pawl mechanism to co-operate with and transmit the oscillatory movement thereof to rotary movement of the gear in one direction and adjust the gate to increase the delivery of material from the hopper onto the conveyer and by the movement of the weighing beam to overload position cause said pawl mechanism to co-operate with and transmit the oscillatory movement thereof to rotary movement of the gear in the opposite direction and adjust the gate to decrease the delivery of material from the hopper onto the conveyer.

12. In material feeding means, a conveyer, a material supply hopper having an outlet, weighing means arranged to support a portion of the conveyer and including adjustable counterpoise to counterbalance a load of predetermined weight on the conveyer, a gate adjustable relative to the hopper outlet to control the delivery of material from the hopper, means including a rotatable toothed wheel to adjust the gate to vary the area of the hopper outlet to increase or decrease the delivery of material from the hopper, a shaft rotatable from the conveyer, pivoted pawl means operatively connected to and oscillated from the rotation of said shaft, means disposed in the path of movement of said pawl means adapted to be engaged by and position the pawl means out of operative relation with said toothed wheel when the weighing means is in equilibrium, and means actuated by the movement of the weighing means to underload and overload position into the path of movement of the oscillatory pawl means adapted to be engaged by and actuate the pawl means to position to co-operate with the toothed wheel to transmit the oscillatory movement of the pawl means to rotary movement of said wheel and actuate the gate adjusting means to adjust the gate to decrease or increase the delivery of material from the hopper.

13. In material feeding means, a travelling conveyer, weighing mechanism arranged to support a portion of the conveyer and including adjustable counterpoise to counterbalance a load of predetermined weight upon said portion of the conveyer, a material supply hopper having an outlet to deliver material onto the conveyer, a gate for controlling the hopper outlet and delivery of material from the hopper onto the conveyer, a shaft rotatable from the conveyer, a friction member rotated from said shaft at a speed proportional to the speed of travel of the conveyer, a friction wheel driven from and adjustable relative to the friction member to vary the speed of rotation of the friction wheel, means to adjust the counterpoise to counterbalance loads of different weight on the conveyer and simultaneously adjust said friction wheel relative to the friction member proportional to the adjustment of the counterpoise, and a register operatively connected to and actuated from the rotation of said friction wheel to record the weight of the material transported and fed by the conveyer.

14. In material feeding means, a travelling conveyer, a hopper having an outlet to deliver material from the hopper onto the conveyer, an adjustable gate to control the hopper outlet, weighing mechanism arranged to support a portion of the conveyer and counterbalance a load of predetermined weight upon the conveyer, means operative to adjust the gate to regulate the area of the hopper outlet and control the delivery of material from the hopper to the conveyer including a rotatable toothed wheel and pawl means pivotally supported coaxially of the toothed wheel and normally positioned out of operative relation to said wheel, means to connect and oscillate the pawl means from the conveyer, means connected to the weighing mechanism movable into and out of the path of movement of the pawl means, said means when the weighing mechanism is in equilibrium being positioned out of the path of movement of the pawl means and by movement of the weighing mechanism to overload or underload position by variations in the weight of the material transported by the conveyer positioned to be engaged by and actuate the pawl means into operative relation with the toothed wheel and actuate the gate adjusting means to increase or decrease the delivery of material from the hopper onto the conveyer and maintain delivery of material by the conveyer at a constant predetermined rate, a register, and means operatively connected to said means actuated from the conveyer to oscillate the pawl means operative to actuate the register to record the weight of the material transported by the conveyer.

15. In material feeding means, a travelling conveyer, a hopper having an outlet to deliver material onto the conveyer, an adjustable gate to control the area of the hopper outlet and delivery of material from the hopper onto the conveyer, a weighing beam arranged with means to support a portion of the conveyer, counterpoise adjustable on the beam to counterbalance a load of predetermined weight upon the conveyer, means to adjust said gate and control the delivery of material from the hopper, a shaft rotatable from the conveyer, means to couple and uncouple said shaft from the gate adjusting means, means operative when the weighing beam is in equilibrium to actuate said coupling means to uncouple said shaft from and render the gate adjusting means inactive, means controlled by the movement of the weighing beam to underload or overload positions by variations in the weight of the material transported by the conveyer to actuate said coupling means to couple said gate adjusting means to and actuate the same from the shaft to vary the area of the hopper outlet and increase or decrease the delivery of material from the hopper onto the conveyer and maintain the delivery of material by the conveyer at a constant rate, a register, and means actuated by the shaft rotated from the conveyer to actuate the register to record the weight of the material transported by the conveyer.

KATHERINE S. MERRICK,
*Executrix of the Estate of Herbert L. Merrick, Deceased.*